Patented Jan. 6, 1925.

1,522,304

UNITED STATES PATENT OFFICE.

GEORGE C. LANG, OF TOWNERS, NEW YORK.

FUEL COMPOSITION AND METHOD OF MANUFACTURING THE SAME.

No Drawing. Application filed August 29, 1924. Serial No. 735,027.

To all whom it may concern:

Be it known that I, GEORGE C. LANG, a citizen of the United States, residing at Towners, in the county of Putnam and State of New York, have invented certain new and useful Improvements in Fuel Compositions and Methods of Manufacturing the Same, of which the following is a specification.

This invention relates to a fuel composition and method of manufacturing the same, and has for its object, to provide in a manner as hereinafter set forth, a composition of the class referred to for use as a substitute for coal, and further the provision of a fuel substitute that will retain its integrity under the influence of the heat of combustion, as well as to provide, as an element of the fuel composition, an agent to excite or expedite combustion.

Further objects of the invention, are to provide in a manner as hereinafter set forth, a composition of the class referred to for use as a substitute for fuel which is thoroughly efficient in its use and comparatively inexpensive to manufacture.

The composition consists of the following ingredients in the proportions stated; viz.:

Sand, white or red, 2 tons.
Cement, ¾ to 1 ton.
Bituminous material, 1 to 2 tons.
Oxalic acid, 5 to 15 lbs.
Liquid hydrocarbon.
Water.

Preferably the proportions are sand two tons, cement one ton, bituminous material, such as soft coal, one and one quarter tons, oxalic acid seven pounds, water of a quantity to provide the mass, after being mixed, to form a substantially plastic body which is dried, and liquid hydrocarbon, such as petroleum, of a quantity sufficient to coat the dried body by spraying.

The sand is employed to hold the heat after it is generated from the bituminous material, the cement to form a binder, the bituminous material generates the heat, the oxalic acid to excite and stimulate combustion, and liquid hydrocarbon to assist in starting the combustion of the bituminous material.

The method of manufacturing the fuel composition, in accordance with this invention, consists in mixing the oxalic acid with a body of water; of a quantity sufficient, to provide a substantially plastic body after the sand, cement, and bituminous material has been added thereto.

The sand, cement and bituminous material are mixed together by any suitable apparatus, and after mixing are screened under a state of agitation which tends to thoroughly mix the same. This mixture is then added to the oxalic acid solution and thoroughly agitated, after which the homogeneous mass is run into a mold or a large shallow receptacle and dried, preferably in the shallow receptacle to form large slabs. After drying in slab like form, the slabs are broken up into particles of the desired size and then sprayed with the liquid hydrocarbon, and is ready for use. If the mass is molded in the form of briquets, these latter after being dried are sprayed with the liquid hydrocarbon.

I do not limit the invention to the specific proportions referred to, as I may vary the proportions of some of the elements employed when producing fuel to be more or less intense to suit the purposes for which my improved artificial fuel is to be employed.

What I claim is:

1. A homogeneous dried fuel comprising sand two tons, cement three quarters of one ton, soft coal one to two tons, and oxalic acid five to fifteen pounds.

2. A method of manufacturing a fuel composition consisting in thoroughly mixing together of proportional amounts of sand, cement and soft coal, then adding said mixed body to a solution of oxalic acid to form a homogeneous mass of a plastic consistency, then drying and forming said mass into particles, and then spraying the particles with liquid hydrocarbon.

3. A method of manufacturing a fuel composition consisting in thoroughly mixing together, by agitation, of proportional amounts of sand, cement and soft coal, then screening, under a state of agitation, said mixed sand, cement and bituminous material, then adding said screened body to a solution of oxalic acid to form a homogeneous mass of plastic consistency, then drying and forming said mass into particles, and then spraying the particles with liquid hydrocarbon.

In testimony whereof, I affix my signature hereto.

GEORGE C. LANG.